(12) United States Patent
Joshi et al.

(10) Patent No.: US 9,501,154 B2
(45) Date of Patent: Nov. 22, 2016

(54) INTERACTIVELY STYLIZING CAMERA MOTION

(71) Applicant: Microsoft Corporation, Redmond, WA (US)

(72) Inventors: Neel Suresh Joshi, Seattle, WA (US); Daniel Scott Morris, Bellevue, WA (US); Michael F. Cohen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 51 days.

(21) Appl. No.: 14/257,605

(22) Filed: Apr. 21, 2014

(65) Prior Publication Data
US 2015/0304560 A1  Oct. 22, 2015

(51) Int. Cl.
*G06F 3/01* (2006.01)
*H04N 5/222* (2006.01)
*H04N 5/262* (2006.01)

(52) U.S. Cl.
CPC ............... *G06F 3/017* (2013.01); *H04N 5/222* (2013.01); *H04N 5/262* (2013.01)

(58) Field of Classification Search
CPC .......................... G11B 27/031; G06F 3/04817
See application file for complete search history.

(56) References Cited

U.S. PATENT DOCUMENTS

| 2012/0105654 | A1 | 5/2012 | Kwatra et al. |
| 2014/0270531 | A1* | 9/2014 | Nakagata ........... G06K 9/00758 |
| | | | 382/191 |
| 2015/0067514 | A1* | 3/2015 | Lewis .................. G11B 27/031 |
| | | | 715/720 |

OTHER PUBLICATIONS

International Preliminary Report on Patentability Issued in PCT Application No. PCT/US2015/024593, Mailed Date: Dec. 7, 2015, 6 Pages.
International Search Report and Written Opinion Issued in PCT Application No. PCT/US2015/024593, Mailed Date: May 29, 2015, 10 Pages.
Neff, et al., "Interactive Editing of Motion Style Using Drives and Correlations", In Proceedings of the ACM SIGGRAPH/Eurographics Symposium on Computer Animation, Aug. 1, 2009, 10 Pages.

* cited by examiner

*Primary Examiner* — Mekonnen Dagnew
(74) *Attorney, Agent, or Firm* — Florin C. Corie; Sandy Swain; Micky Minhas (57) ABSTRACT

The subject disclosure is directed towards modifying the apparent camera path from an existing video into a modified, stylized video. Camera motion parameters such as horizontal and vertical translation, rotation and zoom may be individually modified, including by an equalizer-like set of interactive controls. Camera motion parameters also may be set by loading preset data, such as motion data acquired from another video clip.

20 Claims, 10 Drawing Sheets

INTERACTIVELY STYLIZING CAMERA MOTION

BACKGROUND

Video stabilization is a well-known technique used to make videos look more stable. In general, video stabilization manipulates a moving crop window in a video to remove much of the camera motion.

In contrast, movie directors and cinematographers sometimes intentionally want to use camera movement as part of a video. For example, camera movement during filming can be used to establish pace, point of view, rhythm in a scene and so on.

Such camera motion, along with other video techniques that are typically learned through years of experience, such as framing, color, lighting and so forth, impart a style onto the video. However, without such experience, pre-planning and expensive equipment, it is very difficult to control stylistic aspects of a video.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards modifying camera motion parameters in an existing video into modified motion parameters in a modified video, thereby facilitating production of a stylized video. One or more aspects are directed towards a camera stylizing controller that is coupled to or incorporates an interactive user interface component. The interactive user interface component is configured to allow adjustment of a power level of one or more motion parameter values corresponding to an existing video, including to add to the power level to modify the existing video into a modified video having an apparent camera motion that differs from original camera motion of the existing video.

One or more aspects are directed towards adjusting motion parameter values from an existing video into adjusted motion parameter values of an edited video. This may include controlling independently-controllable motion parameter values for a plurality of motion parameters based upon adjustable motion settings for each motion parameter.

One or more aspects are directed towards obtaining original camera motion parameter values from an original video signal corresponding to an original camera motion path of an existing video clip, and computing a domain (e.g., frequency) representation of the original camera motion parameter values, in which the domain representation includes a plurality of domain bands for each of the original camera motion parameters. An interface is provided for adjustment of individual power level settings in each domain band into adjusted power levels and modification data is computed corresponding to an inverse domain representation of the adjusted power levels. The original camera motion parameter values are modified based upon the modification data to provide a modified video having an apparent camera motion path that differs from the original camera motion path.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards selectively controlling apparent camera motion (and possibly other stylistic aspects) of an already-existing video. In one or more implementations, this may be accomplished via an interactive equalizer-like set of controls that may be used to manipulate the power spectra of a video's apparent camera motion path.

Alternatively, or in addition to use of interactive controls, a user may select stylistic settings from pre-saved data, such as motion styles saved and/or transferred from other video clips. By way of example, a user may capture a video while walking. The user may later select a "boating" motion style that when imparted into the captured "walking" video, makes the video appear to have been recorded while the user was on a boat moving up and down as waves are encountered. The user may, if desired, adjust the settings to make the apparent waves be as large as desired and encountered at a rate as desired.

It should be understood that any of the examples herein are non-limiting. For one, while certain two-dimensional motion transformations (e.g., translation, rotation, and scale) for adjusting the camera motion are primarily exemplified, other aspects such as other dimensions, phase, apparent speed, and so forth also may be controlled based upon the technology described herein. Further, the technology described herein applies to a camera motion path in up to six (three dimensions of translation and three dimensions of rotation) dimensions, such as when depth data is also available from a depth camera. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in stylizing video in general.

Figure 1:
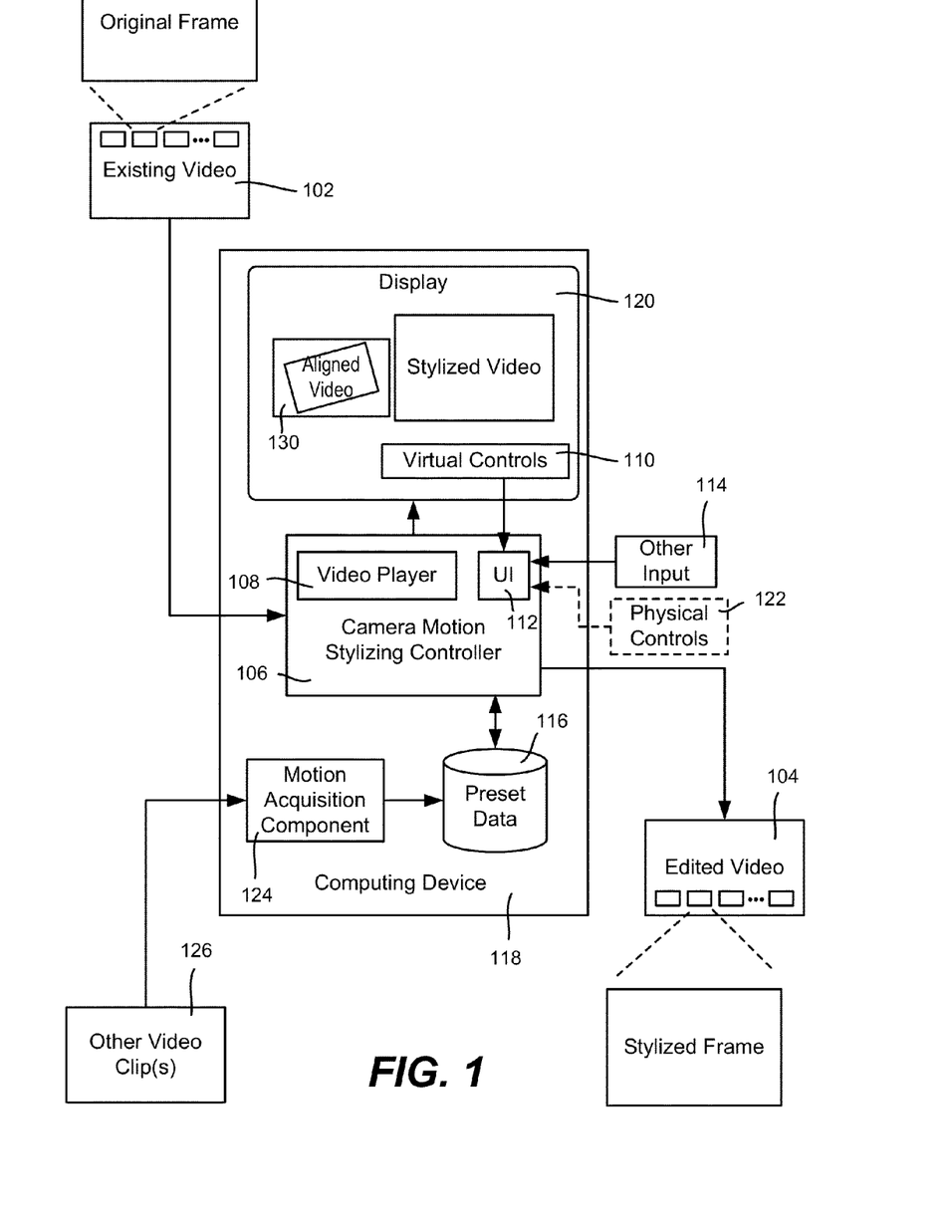
FIG. 1 is a block diagram representing a configuration of example components arranged to generate a stylized video based upon user interaction, according to one or more example implementations.

FIG. 1 shows a generalized block diagram example including components in which existing recorded video 102 comprising some video clip (or a full video) of multiple frames is processed into frames of edited video 104, in which the editing is typically directed towards providing apparent camera motion. Note that the existing recorded video need not be the video as initially recorded, in that a video may be edited one or more times, including by the technology described herein and/or other editing tools, and then re-edited, or partially edited with further editing later resumed. Thus, the term "existing" or "original" as used herein does not necessarily refer to the video as initially recorded, but rather to whatever state the video was in before stylistic editing is started (or resumed) as described herein.

A camera motion stylizing controller (or stylization engine) 106, which incorporates or is coupled to a video player 108 (e.g., software based), allows the user to see how the edited video appears when viewed. This may be while being played, or on a frame-by-frame basis if desired. Thus, edits may occur in real time with the effect is seen immediately (although a user has to wait to see the effect of changes that are chosen to occur slowly over time). The editing is generally performed in one of two ways, which may be combined.

A first way to perform editing is by interactive controls, shown in FIG. 1 as a set of virtual controls 110, e.g., user interface—(UI 112) displayed controls that may be adjusted by interaction with a touch screen display, mouse, keyboard, speech, wearable input device and/or any other suitable interactive modality e.g., represented by other input 114, (the other input may be from a device-internal component rather than external as depicted). A typical set of such virtual controls 110 comprises slider bars, although other types of controls such as knobs or the like may be used, or even undisplayed controls that are accessible through gestures and the like.

A second way to perform editing is by selecting preset data 116, corresponding to automatically globally setting the controls as a group for a desired motion style that already exists. The preset data 116 may be saved, recalled and/or transferred from other video clips. Default sets of preset data may be provided, e.g., corresponding to walking, running, boating, staggering, spinning, jumping, being overly caffeinated and other activities but may also be a preset combination of any one or more sets of motions in the (up to) available six degrees of freedom. The preset data may be loaded from an external source such as the cloud.

Note that preset data may comprise subsets of data that change over time, or a set of data that is varied over time by a time-based computation or other factor (e.g., stylistic motions may match content, a particular actor in a clip and so on). In this way, for example, a video taken with a totally stable camera may be made to appear to be taken by a camera that bounces up and down in time; the y-translation settings may increase and decrease in time to provide the desired bouncing style. Note that for realism, the x-translation, rotation and/or zoom settings may vary (e.g., oscillate) over time as well to an extent, possibly in different phases, so as to avoid the bounce appearing to be perfectly straight up and down.

Another type of stylization editing is based upon the concept of "meta-controls," which may comprise a single slider or knob that controls multiple frequency-based settings, (which the user may or may not see). By way of example, an "on a boat" meta-control such as in the form of a slider may be provided, such that sliding the "on a boat" slider up or down adjusts multiple settings (e.g., individual sliders) at once (e.g., with one user interaction), with the multiple sliders corresponding to different motion parameters and/or different (e.g., frequency, amplitude or other appropriate value setting) adjustments for each motion parameter. Any number of meta-controls may be provided for different style themes (i.e., camera path experiences instead of or in addition to boating), e.g., walking, running, jumping, swinging, swaying (e.g., as if skiing, being buffeted by wind or staggering), falling, rolling, floating, bouncing (e.g., on a trampoline, on a bumpy slide or while driving a bumpy road), turning, shaking, and so forth, at least some of which may be combined, (although as little as a single user interface component may be used that simply changes user-selectable style themes to act as different meta-controls). Note that a meta-control may be learned, at least in part, such as from an example video as described below.

The rates of such motion changes and/or the phases or any other parameter value such as amplitude, etc. may be user configurable. Indeed, a user may select or create a waveform for varying each motion parameter in time, for example, and the phase and/or amplitude of the waveform may be adjusted. The technology may be combined with existing editing concepts such as key frames that identify transition starting and ending frames.

As can be readily appreciated, editing via interactive control and preset data loading may be combined. For example, a set of preset data 112 may be loaded, which automatically adjusts the virtual controls 110 to starting positions. From there, a user may adjust those starting positions as desired, e.g., to fine-tune a user's personal stylistic preference.

Figure 2:
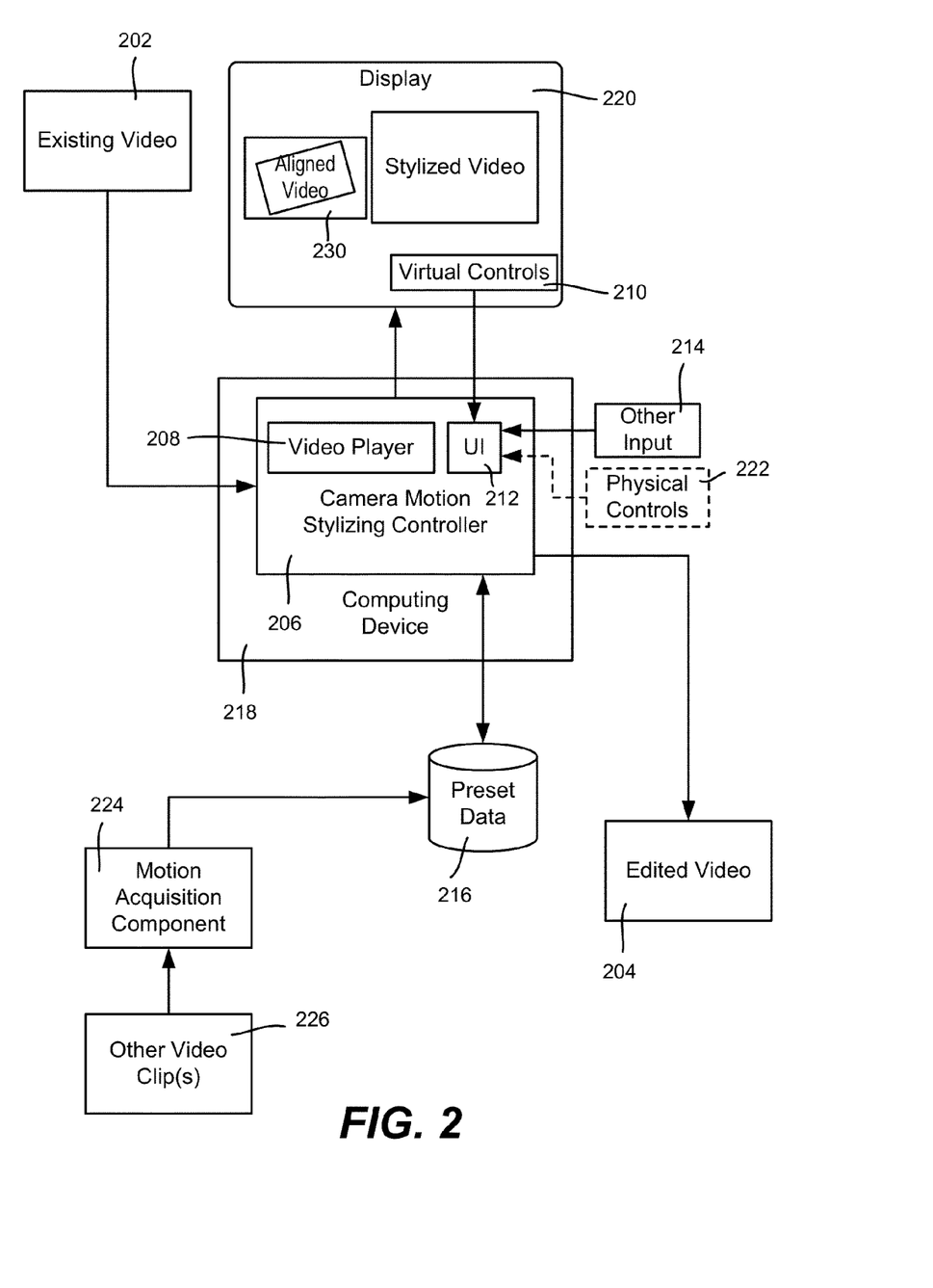
FIG. 2 is a block diagram representing an alternative configuration of example components arranged to generate a stylized video based upon user interaction, according to one or more example implementations.

FIG. 1 shows the various editing components on a single computing device 118 that incorporates a display 120, such as a laptop, tablet, mobile device, hand-held device, wearable device, smartphone or dedicated device. FIG. 2 shows one suitable alternative, such as one that may be implemented on a personal computing device 218 coupled to a remote display 220. Note that like components labeled 1xx in FIG. 1 are labeled 2xx in FIG. 2, and are not described again for purposes of brevity.

FIGS. 1 and 2 also illustrate an optional alternative, exemplified via physical controls 122 and 222, respectively. As can be readily appreciated, a user such as one who is particularly passionate about editing videos may prefer to use physical controls (e.g., mechanically moveable sliders, capacitive touch sliders, scroll wheels, or the like) over virtual ones. Loaded preset data may automatically move such sliders via motors if mechanical sliders, by charge if capacitive sliders and so on, or LEDs or the like next to each slider may indicate the preset settings for guiding manual movement or touch of a slider to each preset setting as desired.

Other alternatives may be used. For example, a dedicated device may be provided, including one that contains both physical controls and/or a camera motion stylizing controller. Indeed, FIGS. 1 and 2 are only examples, and any component shown as incorporated into the computing devices 118 or 218 may instead be an external component coupled thereto, or vice-versa, or separated into subcomponents, one or more of which may be incorporated into the computing devices and one or more of which may be an external subcomponent coupled to the computing device.

Figure 3:
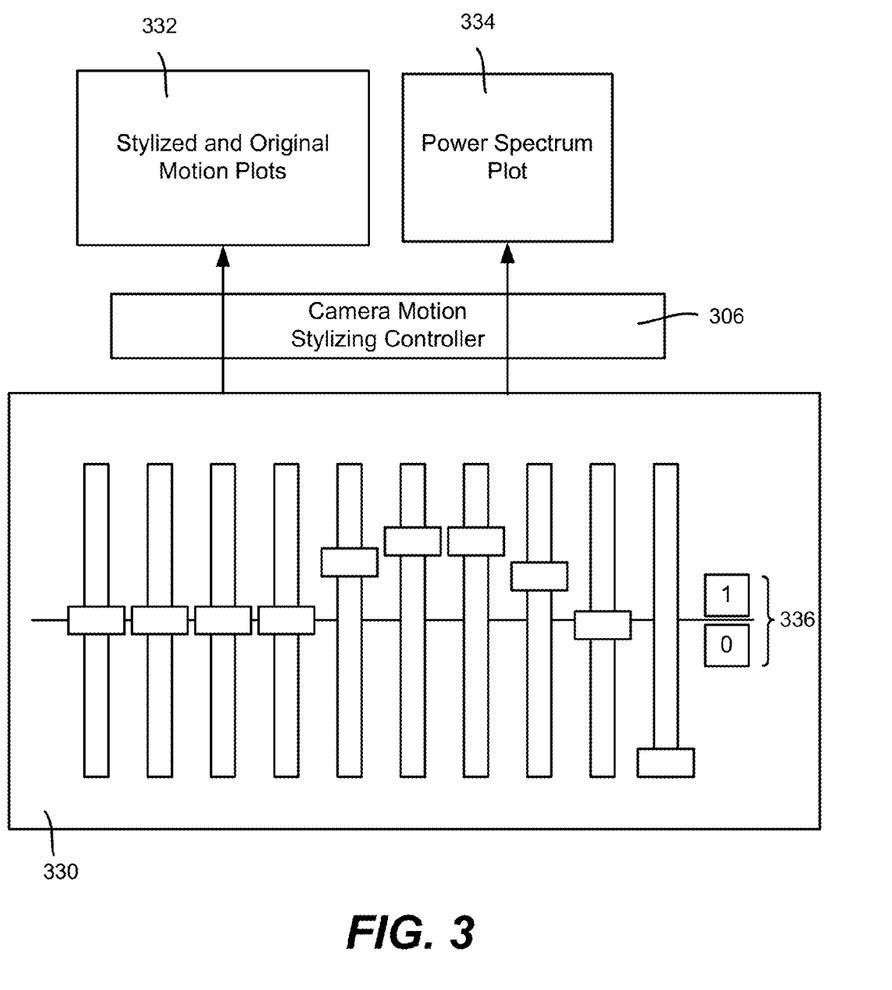
FIG. 3 is a representation of a set of interactive controls exemplified as slider bars that facilitate user interaction to adjust motion parameter values to generate a modified video, according to one or more example implementations.

FIG. 3 shows an example of one set of slider bars 330, whether virtual or physical, in more detail. In this example, there is a set of ten slider bars per motion control parameter, such as providing forty total slider bars: one set for x-translation, one set for y-translation, one set for in-plane rotation, and one set for scale. As exemplified below, this provides a ten band equalizer for each motion control parameter. Note that it is feasible to have a greater number or lesser number of slider bars than ten per control parameters, and that the number of slider bars need not be the same for different control parameters. Also represented in FIG. 3, are stylized and original motion plots 332, and a power spectrum plot 334 that allows the user to graphically visualize the effect of the slider bar settings as they are adjusted.

Figure 4A:
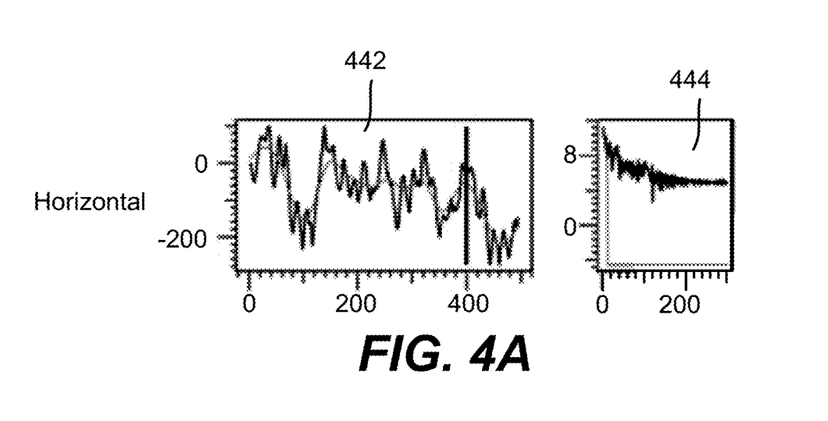
FIGS. 4A, 4B, 5A and 5B are representations of example original and stylized motion plots and power spectrum plots for horizontal (FIG. 4A), vertical (FIG. 4B), rotation (FIG. 5A) and zoom/scale (FIG. 5B) motion parameters according to one or more example implementations.
Figure 4B:
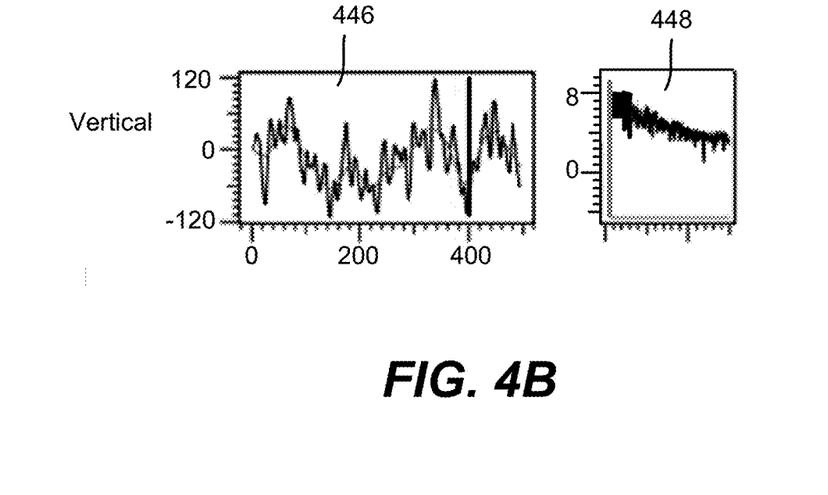
Figure 5A:
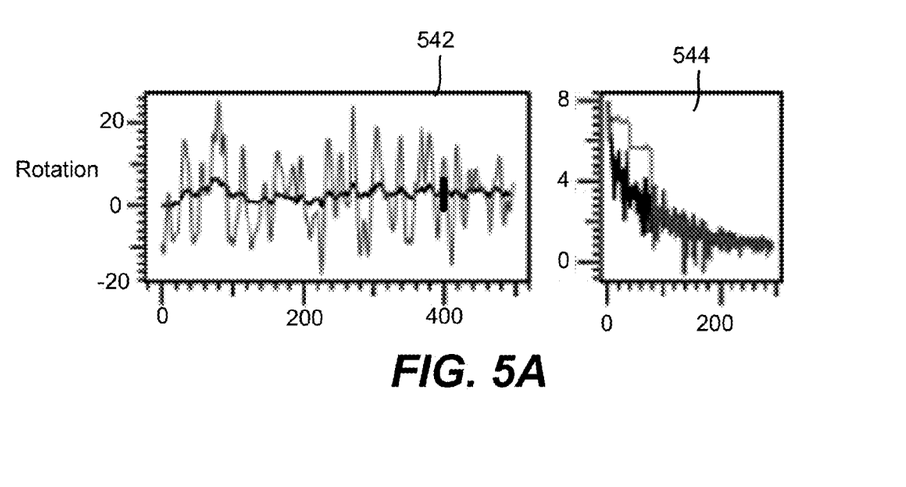
Figure 5B:
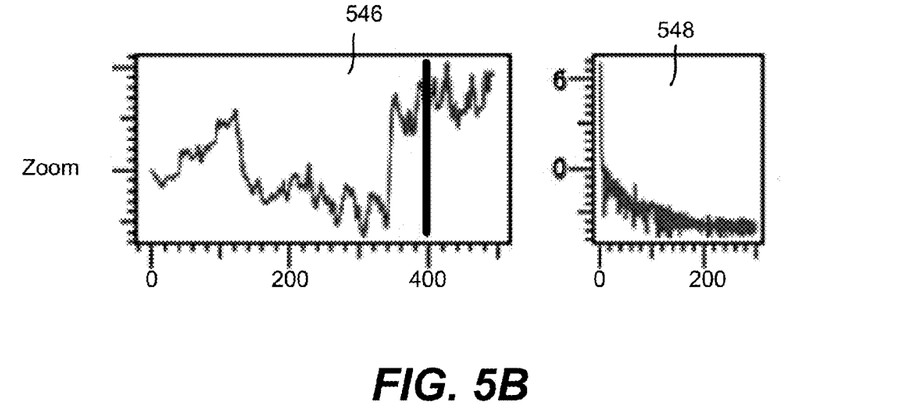

FIGS. 4A and 4B show example motion plots 442, 446 and power spectrum 444, 448 for horizontal and vertical translation, respectively. In one or more implementations, the stylized motion plot overlays the original motion plots in a single graphical representation for simultaneously viewing both. These plots will vary as the settings are changed via the user interface. FIGS. 5A and 5B show example motion plots 542, 546 and power spectrum 544, 548 for rotation and zoom (scale), respectively.

Figure 6:
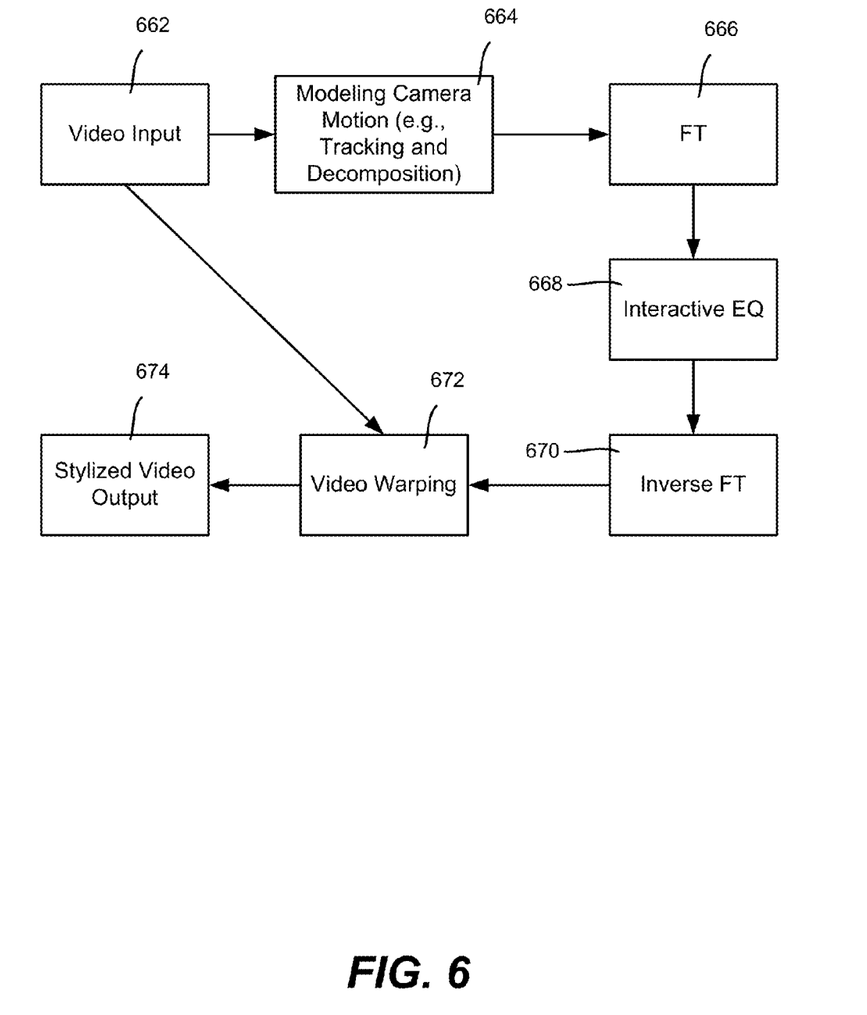
FIG. 6 is a block diagram showing example components that may be used in modifying original video into stylized video according to one or more example implementations.

Turning to controller operation, in one or more implementations, as generally represented in FIG. 6, stylization of motion from video input 662 may be accomplished by manipulating a multi-band equalizer 668 independently for each motion parameter via the set of user interface elements (such as sliders or any other appropriate UI) for each or a collective of parameters. In general, the controller is configured to output a desired camera motion path S'[t, 0], which can be decomposed into motion parameters (e.g., x-translation, y-translation, rotation and scale/zoom) which may be represented as $[x'_t, y'_t, \theta'_t, s'_t]$ or any other suitable set of parameters. Given S[t, 0] as the transform in the existing video 662 between any frame (t) and the base (first or other) frame (0), represented by $[x_t, y_t, \theta t, s_t]$, and the modified transform S'[t, 0] from the stylized motion path $[x'_t, y'_t, \theta'_t, s'_t]$, a frame in the stylized sequence can be computed by warping the frame (block 672) based on the difference between S[t, 0] and S'[t, 0]. This is equivalent to warping the image to the base (first) frame's coordinate system and then applying the inverse transformation 670 to map to the stylized sequence.

As shown in FIG. 6, the camera motion parameters in the input video 662 may be tracked and decomposed (block 664) to provide the unchanged original motion data for the camera motion parameters. As described below with reference to FIG. 7, this data may be converted to the frequency domain via an FT (Fourier Transform) 666, where the interactive equalizer 668 may modify power levels in individual frequency bands corresponding to the input controls or pre-set parameter values. Once modified, an inverse FT 670 provides the motion data for warping the original motion data in the video input 662 into the stylized video output 674.

Note that instead of frequency domain changes, other filters may be used for the same purpose, including other types that may be inverted. Although such filters will effectively modify frequency, the changes need not occur in the frequency domain.

As can be readily appreciated, a transformation other than an identity transformation may create unknown regions around the video border. The final result thus may be cropped to eliminate the unknown regions. The crop may be fixed, (e.g., to eighty percent of the existing video size), or may be user configurable or variable instead of fixed. Cropping may set bounds on how much the stylized motion can vary from the existing motion. Notwithstanding, instead of or in addition to cropping, other known techniques may be used to handle unknown regions, such as filling in unknown regions from other frames or areas of the same frame.

Figure 7:
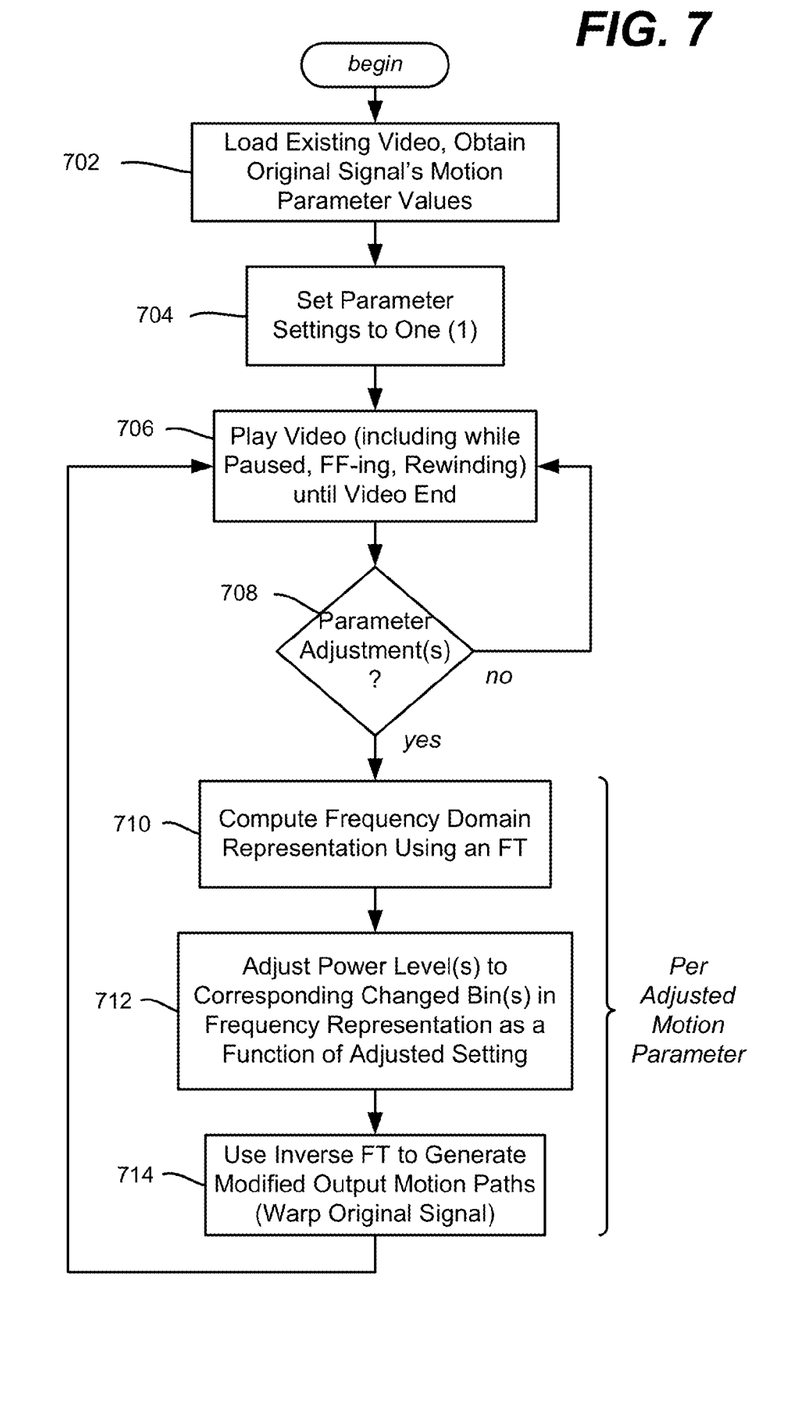
FIG. 7 is a flow diagram showing example steps that may be taken in modifying original video into stylized video according to one or more example implementations.

FIG. 7 is an example flow diagram that describes how user or other (e.g., preset or timed) manipulation of the parameter values (or motion controller) may accomplish the change, beginning at step 702 where a video is loaded. When loaded step 704 sets the parameter values to their unchanged settings, which in this example sets them to one (1). As part of this action of setting the parameter values within the controller, the controller may also reflect those set values to the user through the user interface, such as the equalizer or other suitable value indication. Thus when the video is first played, the video motion appears unchanged.

Step 706 represents playing the video. Note that in one or more implementations, editing via adjustments may be performed while playing, or while paused on a frame, fast forwarding (FF) or rewinding. In some instances, the user may also create a pre-timed 'program' to adjust parameter values at user indicated times or milestones. While playing, the display shows the video aligned to a global canvas (e.g., an uncropped "frame space") 130 and 230 in FIGS. 1 and 2 respectively, to show how the current frame relates to the others in space. Any effects may be applied in real time, e.g., while playing at thirty frames per second.

Figure 8:
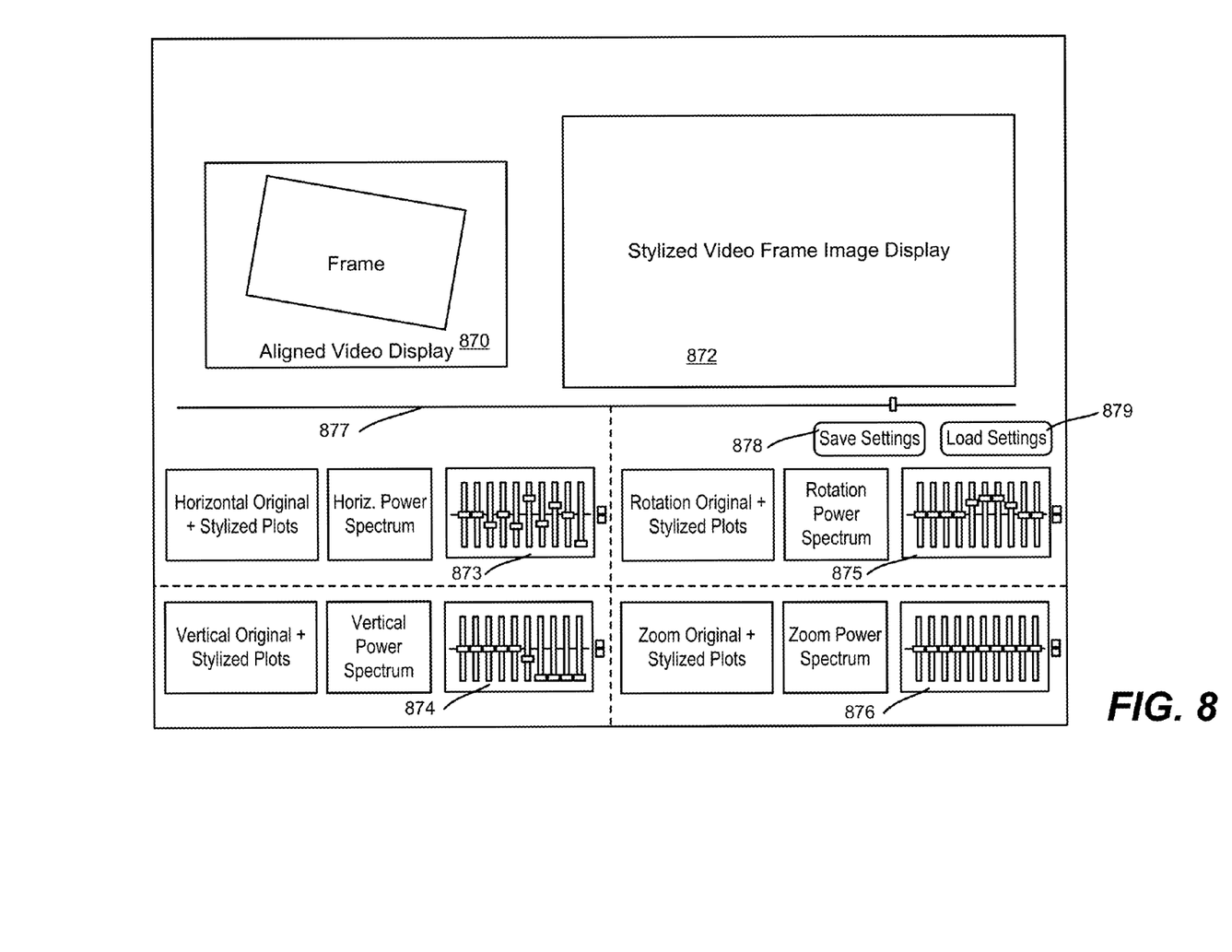
FIG. 8 is a representation of an interactive user interface component that facilitates user interaction to adjust motion parameter values to generate a modified video, according to one or more example implementations.

Example locations for showing the video are generally represented in FIG. 8, where an example full user interface control panel including display frames 870, 872, sets of slider bars 873-876 (in this example for controlling horizontal, vertical, rotation and zoom parameters), a timeline 877 and save and load mechanisms (e.g., interactive buttons) 878, 879 are exemplified. Thus, depicted are four sub-panels for each adjustable motion parameter (x, y, θ, s) representing horizontal, vertical, rotation and zoom parameters respectively. Each panel has a plot of the original and stylized motion, a plot of the original and stylized power spectrum, and a ten-band equalizer in this example. As shown in more detail in FIG. 3, in one or more implementations, each equalizer parameter control interface has shortcut buttons 336; if the "1" button is actuated for its respective interface, the controller sets the corresponding sliders to "1", which yields the original, unmodified motion, while if the "0" button is actuated the sliders are set to "0" for no motion at all for this motion parameter. It is to be appreciated that the parameter values of horizontal, vertical, rotation and zoom parameters are examples only and that other parameter values may be used to control the motion of the video, and similarly that the scaling or valuation of "1" and "0" are exemples only and other parameter valuations may be appropriate.

Returning to FIG. 7, one or more implementations as described herein use a frequency-based equalization approach to edit camera motion style. The camera motion equalizer (EQ) is an interactive method to amplify, dampen, or transfer the frequency components of camera motion to create a desired look and feel. In this example, the motion signal is separated into the four channels of x (horizontal) translation, y (vertical) translation, in-plane rotation θ, and scale (e.g., zoom or z-direction) s corresponding to four degrees of freedom of a camera in two-dimensions.

Whenever an equalizer adjustment(s) is made by the user or by timed adjustment, or is needed because of loading new preset data, step 708 branches to step 710 to modify the video's motion for each modified motion parameter channel. For each modified channel, the controller computes a domain conversion or transformation such as a frequency-space representation using an FT at step 710, and then adjusts the parameter values or other value such as power at step 712 to match the parameter setting. Note that adjustment may be made by multiplying or adding (or subtracting) power to frequency range bins as a function of each input parameter setting corresponding to a domain such as a frequency band, (as described below with reference to FIG. 9). At step 712 an inverse domain conversion, such as an inverse FT, is then used to generate the output motion paths as if the camera took that path. Note that steps 710, 712 and 714 are per adjusted motion parameter; thus, for example if a preset is loaded, x-translation, y-translation, rotation and scale (or any other or combination of motion parameters) each may need an adjustment via corresponding steps, which may be performed in parallel, at least to an extent.

Figure 9:
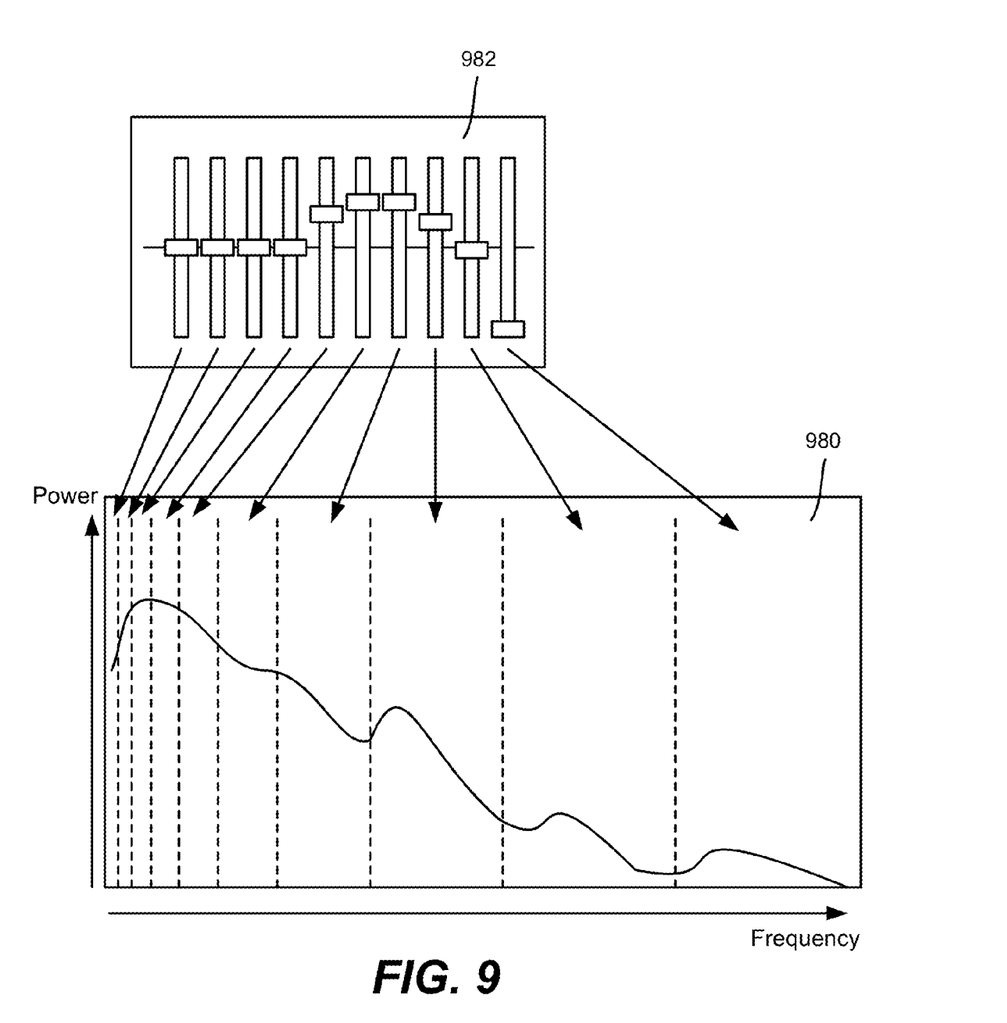
FIG. 9 is a representation of how slider bars may be mapped to frequency bands to individually control motion parameter power levels in each band to generate a modified video, according to one or more example implementations.

FIG. 9 shows an example of how frequency bins 990 may be arranged for an example one of a controlled parameter's set of values (e.g., such as those input in the displayed an example equalizer sliders 992). In this example, the frequency bins are nonlinearly (such as logarithmically or otherwise exponentially) spaced in frequency in one or more implementations, with the bin size increasing as the frequency increases. Note that the user input parameter values or scaling, such as through the example user interface equalizer or other appropriate user interface, does not modify the DC component of the signal, although providing an interface mechanism to do so is feasible in alternative implementations, such as to completely re-position the camera from a single interface. Note that the displayed equalizer-like controller technology and associated described motion parameters described herein complements other known tools for changing the fundamental camera motion path, such as motion transformations via the DC component, and key-framing.

In one or more implementations, the user interface for adjusting the motion parameter values (such as through the slider values and which may either directly input a changed value for the parameter and/or provide a scaling value) range between zero (0) and two (2) for each bin, where a value of one (1) provides the original motion, (that is, unchanged from the existing video's motion). From zero to one, the value may be treated as a dampening multiplier in the frequency domain (or other domain as appropriate), e.g., linearly multiplying the original power level in a frequency band by the setting's fractional (or zero) value to lower the power level in that frequency band. Thus, such scaling values dampen frequencies in the original signal; indeed, adjusting all settings to zero for all motion parameters may create a substantially stabilized video.

In one or more implementations, motion parameter scaling values above one may, in some instances, result in an additive operation instead of a multiplicative operation. In general, the system switches from multiplicative to additive because multiplication has little to no effect when the original magnitude of a frequency in the motion path is at or near zero. By adding (zero phase power) to the existing power magnitude, frequency content that was not originally present becomes present. This allows stylizing stationary videos, such as those filmed on a tripod, as well as further addition or subtraction of motion to videos with existing motion, such as videos taken with a hand-held camera. A single motion parameter input user interface, such as a slider, may be used to smoothly transition between multiplicative and additive changes in one or more embodiments.

Notwithstanding, many variations if the above schemes are possible. For example, frequency bands need not be logarithmically spaced, and can, for example, be linearly spaced. Instead of having a multiplicative and additive distinction, a formula or sets of precompiled constants may be used to provide the desired power levels or other domain parameter adjustment for motion parameters. As yet another example, two input user interface devices (such as sliders), one for additive, one for multiplicative, may be used for each frequency band or range. As still another example, instead of linear multiplicative or additive changes, a computation that may perform non-linear (e.g., exponential) changes may be used.

Although in reality the camera that captured the existing video may have moved and rotated in six dimensions, in one or more implementations two-dimensional transformations (translation, rotation, and scale) may be used for modeling and adjusting the camera motion. This simplification assumes that the effect of camera motion on the scene can be modeled as a time-varying set of rigid image transformations. Thus, to make the parameters of the motion model concise and understandable to a user, a similarity motion model may be used in one or more embodiments, which models camera motion as a time-varying set of transformations, $S_t$, that decomposes to an example four values: $[x_t, y_t, \theta_t, s_t]$, representing horizontal translation, vertical translation, in-plane rotation, and global image scale, although any combination of or with alternative or additional parameters values may be appropriate. In cinematographic terms, these map to pan left/right, pan up/down, roll, and zoom (or forward/backward dolly). Notwithstanding, other implementations also may model depth or perspective changes, and for example, sliders or the like for changing depth motion parameter values may be provided.

Although the technology is primarily directed towards "un-stabilizing" a video in contrast to video stabilization techniques, the technology may be used for stabilizing purposes. For example, stabilized video often looks unnatural because it can be too stable. The technology described herein can add some motion to a stabilized video to make it look more natural.

Turning to another aspect, namely stylizing camera motion by example, a user may have another video clip (an example) whose style the user wants to match. In this situation, an automated approach is performed to set the motion parameter values by acquiring motion data from the example video clip. In one example scenario, the user may load the example into an acquisition component, and the component analyzes the video to calculate the motion parameter values that will scale or add/subtract (as appropriate) to the associated domain parameters (such as power) in each domain (e.g., frequency) band so the input video has the same average domain parameter value (such as power) in each band as is present in the example. This is generally represented in FIGS. 1 and 2 via a motion acquisition component 124 (FIG. 1) and 224 (FIG. 2) processing one or more other video clips 126 (FIG. 1) and 226 (FIG. 2).

Recovering/acquiring the apparent camera motion from a video amounts to inferring the sequence of transformation for each frame that best maps that frame to a base frame (or any other suitable frame). The alignment may be computed by determining a base which may be a first frame in a sequence, a determined representative frame, or any other appropriate frame in the video sequence. The alignment may then include extracting image features for each frame and performing a search between frames (as compared to the base frame or a previous or succeeding frame) to find matching features. A feature in some instances may be determined to be a match if the descriptor distance of the best match is sufficiently different from that of the second-best match (which is computed by looking at the ratio of the first to second match, which is also referred to as a ratio test). To avoid locking onto scene motion, the tracks may be analyzed to distinguish foreground motion from background static features, such as by using a RANSAC (RANdom SAmple Consensus) method or any other appropriate method to find the largest set of inlier tracks such that a single temporal sequence of similarity transforms can map background features to their positions in the base frame. The transforms are then decomposed into appropriate motion parameter values form the base frame (which may be a static frame or may periodically or occasionally change over time). As noted above, example motion parameters may include x and y translation, rotation, and scale components.

As can be seen, one or more aspects are directed towards a camera stylizing controller that is coupled to or incorporates an interactive user interface component. The interactive user interface component is configured to allow adjustment of a power level of one or more motion parameter values corresponding to an existing video, including to add to the power level to modify the existing video into a modified video having an apparent camera motion that differs from original camera motion of the existing video.

In one or more implementations, the user interface component comprises a plurality of sets of user interface elements, (e.g., slider bars), with one or more motion parameter values controllable by interaction with one of the sets of user interface elements. Each of the user interface elements may correspond to a power level setting in a domain (e.g., frequency) band. Each of the user interface elements may have a multiplicative component below an unchanged power level setting and an additive component above an unchanged power level setting.

The user interface component may comprise a load mechanism configured to load preset data corresponding to the motion parameter values. The user interface component may comprise virtual and/or physical controls. The user interface component may comprise a display component configured to display an original motion plot, a stylized motion plot, and/or a power spectrum plot for the motion parameters, and/or may display a representation of the modified video.

The user interface component may comprise a meta-control configured to adjust settings for different motion parameters at once and/or different settings for at least one motion parameter at once, based upon user interaction with the meta-control. The meta-control may correspond to one or more themes (experiences), e.g., boating, walking, running, jumping, swinging, swaying, falling, rolling, floating, bouncing, turning, or shaking.

In one or more aspects, the camera stylizing controller may be configured to allow frequency domain adjustment of a power level. A motion acquisition component may be provided to acquire motion data from another video clip.

One or more aspects are directed towards adjusting motion parameter values from an existing video into adjusted motion parameter values of an edited video. This may include controlling independently controllable motion parameter values for a plurality of motion parameters based upon adjustable motion settings for each motion parameter.

Adjusting the motion parameter values may be accomplished by (for at least one motion parameter) transforming an original motion signal into a domain (e.g., frequency) representation corresponding to power data, changing a power level of the power data within at least one of one or more domain ranges in the domain representation, and inverse transforming the domain representation into data that adjust the original motion signal into a modified motion signal.

The adjustable motion settings may be obtained via an interactive user interface, including via an interactive user interface comprising a set of user interface elements with adjustable settings for each motion parameter. The set of user interface elements for each motion parameter may comprise a plurality of slider bars, with each slider bar corresponding to a different frequency range, for example. The adjustable motion settings may be obtained from preset data.

One or more aspects are directed towards obtaining original camera motion parameter values from an original video signal corresponding to an original camera motion path of an existing video clip, and computing a domain (e.g., frequency) representation of the original camera motion parameter values, in which the domain representation includes a plurality of domain bands for each of the original camera motion parameters. An interface is provided for adjustment of individual power level settings in each domain band into adjusted power levels and modification data is computed corresponding to an inverse domain representation of the adjusted power levels. The original camera motion parameter values are modified based upon the modification data to provide a modified video having an apparent camera motion path that differs from the original camera motion path. The interface for adjustment of the individual power level settings in each domain band may comprise virtual controls, physical controls, and/or a load mechanism for loading preset data corresponding to the power level settings.

Example Operating Environment

Figure 10:
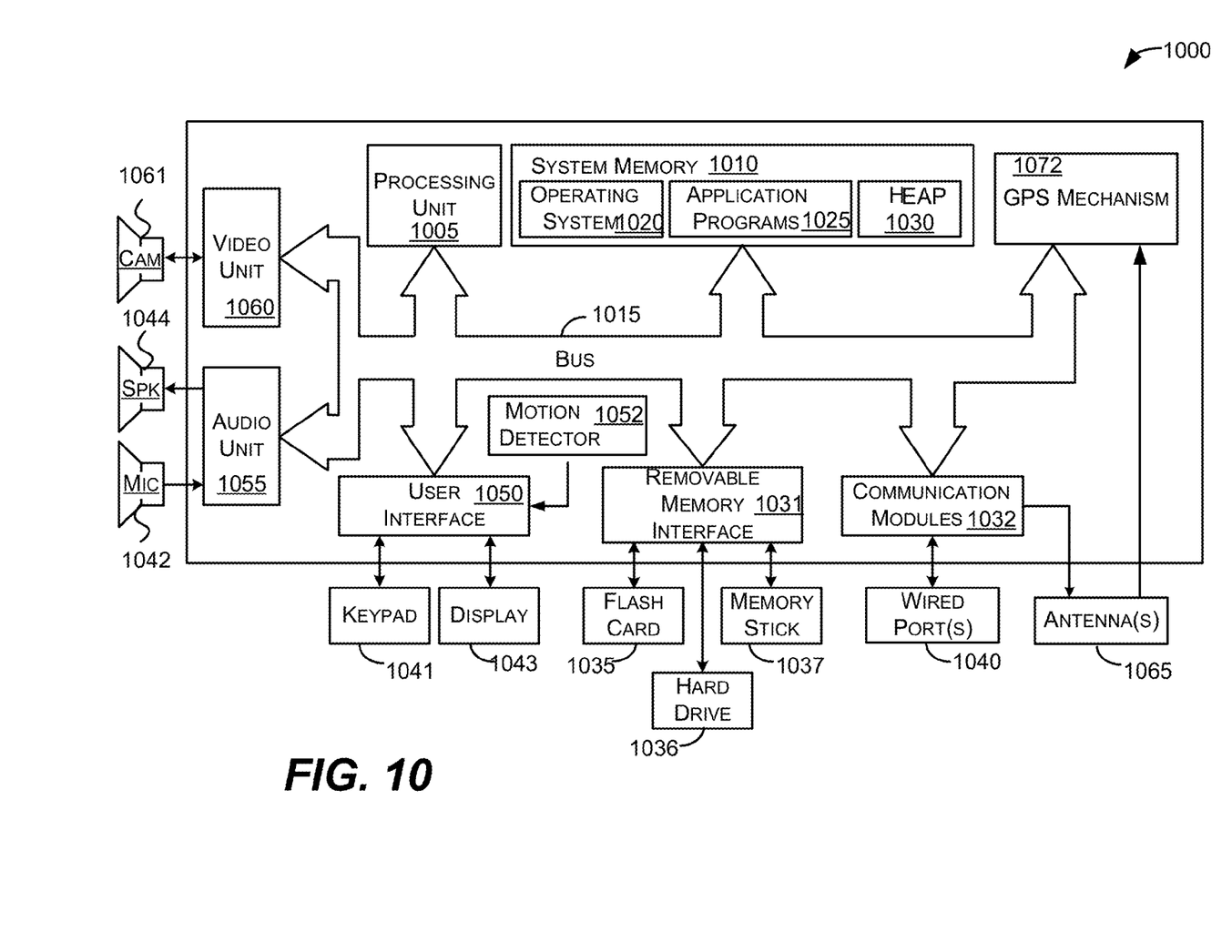
FIG. 10 is a block diagram representing an example non-limiting computing system and/or operating environment in which one or more aspects of various embodiments described herein can be implemented.

FIG. 10 illustrates an example of a suitable mobile device 1000 on which aspects of the subject matter described herein may be implemented. The mobile device 1000 is only one example of a device and is not intended to suggest any limitation as to the scope of use or functionality of aspects of the subject matter described herein. Neither should the mobile device 1000 be interpreted as having any dependency or requirement relating to any one or combination of components illustrated in the example mobile device 1000. The mobile device may comprise a hand-held device such as a smartphone, tablet, laptop and so on. A personal computer may alternatively be used, for example.

At least part of the example mobile device 1000 may be worn on glasses, goggles or hats, or other wearable devices such as wristwatch-type devices, including external computers are all suitable environments. Note that although glasses and hats are worn on the head, they may be worn in different positions relative to the head, and thus head position bias correction may be appropriate.

With reference to FIG. 10, an example device for implementing aspects of the subject matter described herein includes a mobile device 1000. In some embodiments, the mobile device 1000 comprises a cell phone, a hand-held device that allows voice communications with others, some other voice communications device, or the like. In these embodiments, the mobile device 1000 may be equipped with a camera for taking pictures, although this may not be required in other embodiments. In other embodiments, the mobile device 1000 may comprise a personal digital assistant (PDA), hand-held gaming device, tablet/slate computing device, notebook computer, printer, appliance including a set-top, media center, or other appliance, other mobile devices, or the like. In yet other embodiments, the mobile device 1000 may comprise devices that are generally considered non-mobile such as personal computers, servers, or the like.

Components of the mobile device 1000 may include, but are not limited to, a processing unit 1005, system memory 1010, and a bus 1015 that couples various system components including the system memory 1010 to the processing unit 1005. The bus 1015 may include any of several types of bus structures including a memory bus, memory controller, a peripheral bus, and a local bus using any of a variety of bus architectures, and the like. The bus 1015 allows data to be transmitted between various components of the mobile device 1000.

The mobile device 1000 may include a variety of computer-readable/machine-readable media. Such media can be any available media that can be accessed by the mobile device 1000 and includes both volatile and nonvolatile media, and removable and non-removable media. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage devices/media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 1000.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, Wi-Fi, WiMAX, and other wireless media.

The system memory 1010 includes computer storage media in the form of volatile and/or nonvolatile memory and may include read only memory (ROM) and random access memory (RAM). On a mobile device such as a cell phone, operating system code 1020 is sometimes included in ROM although, in other embodiments, this is not required. Similarly, application programs 1025 are often placed in RAM although again, in other embodiments, application programs may be placed in ROM or in other computer-readable memory. The heap 1030 provides memory for state associated with the operating system 1020 and the application programs 1025. For example, the operating system 1020 and application programs 1025 may store variables and data structures in the heap 1030 during their operations.

The mobile device 1000 may also include other removable/non-removable, volatile/nonvolatile memory. By way of example, FIG. 10 illustrates a flash card 1035, a hard disk drive 1036, and a memory stick 1037. The hard disk drive 1036 may be miniaturized to fit in a memory slot, for example. The mobile device 1000 may interface with these types of nonvolatile removable memory via a removable memory interface 1031, or may be connected via a universal serial bus (USB), IEEE 10394, one or more of the wired port(s) 1040, or antenna(s) 1065. In these embodiments, the removable memory devices 1035-1037 may interface with the mobile device via the communications module(s) 1032. In some embodiments, not all of these types of memory may be included on a single mobile device. In other embodiments, one or more of these and other types of removable memory may be included on a single mobile device.

In some embodiments, the hard disk drive 1036 may be connected in such a way as to be more permanently attached to the mobile device 1000. For example, the hard disk drive 1036 may be connected to an interface such as parallel advanced technology attachment (PATA), serial advanced technology attachment (SATA) or otherwise, which may be connected to the bus 1015. In such embodiments, removing the hard drive may involve removing a cover of the mobile device 1000 and removing screws or other fasteners that connect the hard drive 1036 to support structures within the mobile device 1000.

The removable memory devices 1035-1037 and their associated computer storage media, discussed above and illustrated in FIG. 10, provide storage of computer-readable instructions, program modules, data structures, and other data for the mobile device 1000. For example, the removable memory device or devices 1035-1037 may store images taken by the mobile device 1000, voice recordings, contact information, programs, data for the programs and so forth.

A user may enter commands and information into the mobile device 1000 through input devices such as a key pad 1041 and the microphone 1042. In some embodiments, the display 1043 may be touch-sensitive screen and may allow a user to enter commands and information thereon. The key pad 1041 and display 1043 may be connected to the processing unit 1005 through a user input interface 1050 that is coupled to the bus 1015, but may also be connected by other interface and bus structures, such as the communications module(s) 1032 and wired port(s) 1040. Motion detection 1052 can be used to determine gestures made with the device 1000.

As described herein, the input may be processed into desired output. The processing may be performed in software, in hardware logic, or in a combination of software and hardware logic.

With respect to manual control, a user may use any of various interactive modalities as an input device, such as a mouse, touch-screen, game controller, remote control and so forth. Speech and/or gestures may be detected to control the settings. Indeed, control may be facilitated by conventional interfaces such as a mouse, keyboard, remote control, or via another interface, such as Natural User Interface (NUI), where NUI may generally be defined as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other categories of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, as well as technologies for sensing brain activity using electric field sensing electrodes.

A user may communicate with other users via speaking into the microphone 1042 and via text messages that are entered on the key pad 1041 or a touch sensitive display 1043, for example. The audio unit 1055 may provide electrical signals to drive the speaker 1044 as well as receive and digitize audio signals received from the microphone 1042.

The mobile device 1000 may include a video unit 1060 that provides signals to drive a camera 1061. The video unit 1060 may also receive images obtained by the camera 1061 and provide these images to the processing unit 1005 and/or memory included on the mobile device 1000. The images obtained by the camera 1061 may comprise video, one or more images that do not form a video, or some combination thereof.

The communication module(s) 1032 may provide signals to and receive signals from one or more antenna(s) 1065. One of the antenna(s) 1065 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 1072. In turn, the GPS mechanism 1072 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 1000 may connect to one or more remote devices. The remote devices may include a personal computer, a server, a router, a network PC, a cell phone, a media playback device, a peer device or other common network node, and typically includes many or all of the elements described above relative to the mobile device 1000.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A system comprising:
 a camera stylizing controller, the camera stylizing controller coupled to or incorporating an interactive user interface component, the interactive user interface component allowing adjustment of a power level of one or more motion parameter values corresponding to an existing video, including adding to the power level to modify the existing video into a modified video having an apparent camera motion that differs from original camera motion of the existing video,
 wherein the camera stylizing controller further:
  transforms an original motion signal of the existing video into a frequency representation corresponding to power data, and
  changes a power level of the power data within at least one of one or more frequency ranges in the frequency representation.

2. The system of claim 1 wherein the user interface component comprises a plurality of sets of user interface elements, at least one of the one or more motion parameter values controllable by interaction with one of the sets of user interface elements.

3. The system of claim 2 wherein the camera stylizing controller inverse transforms the frequency representation into data that adjust the original motion signal into a modified motion signal, and wherein at least one of the user interface elements corresponds to a power level setting in a frequency band.

4. The system of claim 2 wherein each of the user interface elements has a multiplicative component below an unchanged power level setting and an additive component above an unchanged power level setting.

5. The system of claim 1 wherein the user interface component comprises a load mechanism that loads preset camera oscillation motion data corresponding to the one or more camera motion parameter values.

6. The system of claim 1 wherein the user interface component comprises a meta-control that adjusts settings for different motion parameters at once or different settings for at least one motion parameter at once, or both adjust settings for different motion parameters and different settings for at least one motion parameter at once, based upon user interaction with the meta-control.

7. The system of claim 6 wherein the meta-control corresponds to one or more themes, at least one theme selected from a group consisting of, boating, walking, running, jumping, swinging, swaying, falling, rolling, floating, bouncing, turning, or shaking.

8. The system of claim 1 wherein the user interface component comprises virtual controls or physical controls, or both virtual controls and physical controls.

9. The system of claim 1 wherein the camera stylizing controller allows frequency domain adjustment of a power level.

10. The system of claim 1 wherein the one or more motion parameter values comprise at least one value selected from a group consisting of: a horizontal translation parameter value, a vertical translation parameter value, or a rotation parameter value.

11. A method comprising:
acquiring motion data from a first video clip; and
adjusting motion parameter values obtained from the acquired motion data into adjusted motion parameter values of a second video clip, including controlling independently controllable motion parameter values for a plurality of motion parameters based upon adjustable motion settings for each motion parameter, wherein controlling the motion parameter values comprises, for at least one motion parameter:
transforming an original motion signal into a domain representation corresponding to power data, changing a power level of the power data within at least one of one or more domain ranges in the domain representation; and
inverse transforming the domain representation into data that adjust the original motion signal into a modified motion signal.

12. The method of claim 11 wherein transforming the original motion signal into a domain representation comprises transforming the original motion signal into a frequency representation having one or more frequency ranges in the frequency representation.

13. The method of claim 11 further comprising, obtaining the adjustable motion settings via an interactive user interface.

14. The method of claim 13 wherein obtaining the adjustable motion settings via the interactive user interface comprises providing a set of user interface elements with adjustable settings for each motion parameter.

15. The method of claim 14 wherein providing the set of user interface elements comprises, for each motion parameter, providing a plurality of user interface elements, each user interface element corresponding to a different domain range.

16. The method of claim 11 further comprising, obtaining the adjustable motion settings from preset data.

17. The method of claim 16 further comprising, acquiring at least some of the preset data from another video clip.

18. One or more computer storage memories having executable instructions comprising:
obtaining original camera motion parameter values from an original video signal corresponding to an original camera motion path of an existing video clip;
computing a domain representation of the original camera motion parameter values, in which the domain representation includes a plurality of domain bands for each of the original camera motion parameter values;
providing an interface for adjustment of individual power level settings in each domain band into adjusted power levels; and
computing modification data corresponding to an inverse domain representation of the adjusted power levels; and
modifying the original camera motion parameter values based upon the modification data to provide a modified video having an apparent camera motion path that differs from the original camera motion path.

19. The one or more computer storage memories of claim 18 wherein the domain representation comprises a frequency representation, in which the domain representation includes a plurality of frequency bands, and wherein providing the interface for adjustment of the individual power level settings in each frequency band comprises providing at least one of: virtual controls, physical controls, a load mechanism for loading preset data corresponding to the power level settings, or a meta-control.

20. The system of claim 1 wherein the interactive user interface component further:
applies camera motion to a preset, the camera motion being learned from another video clip; and
applies the preset to the existing video.

* * * * *